United States Patent [19]

Allaire et al.

[11] Patent Number: 5,776,220
[45] Date of Patent: Jul. 7, 1998

[54] METHOD AND APPARATUS FOR BREAKING BRITTLE MATERIALS

[75] Inventors: Roger A. Allaire, Big Flats; Harry E. Menegus, Beaver Dams; Bruce H. Raeder, Horseheads; Harrie J. Stevens, Corning, all of N.Y.

[73] Assignee: Corning Incorporated, Corning, N.Y.

[21] Appl. No.: 573,471

[22] Filed: Dec. 15, 1995

Related U.S. Application Data

[60] Provisional application No. 60/000,497, Jun. 26, 1995.

Related U.S. Application Data

[63] Continuation-in-part of Ser. No. 308,276, Sep. 19, 1994, Pat. No. 5,622,540, and Ser. No. 521,616, Aug. 31, 1995, abandoned.

[51] Int. Cl.$^6$ ............................ B05B 12/00; B05B 12/04; C03C 17/23
[52] U.S. Cl. ............................ 65/112; 65/111; 225/2; 219/121.6
[58] Field of Search .................. 65/112, 111; 219/121.6, 219/121.67, 121.72; 225/2, 96.5, 97, 93.5, 94

[56] References Cited

U.S. PATENT DOCUMENTS

| 4,467,168 | 8/1984 | Morgan et al. ........................ 219/121 |
| 5,237,150 | 8/1993 | Karube ............................. 219/121.72 |

FOREIGN PATENT DOCUMENTS

WO 93/20015  10/1993  WIPO.

*Primary Examiner*—David A. Simmons
*Assistant Examiner*—Calvin Padgett
*Attorney, Agent, or Firm*—Robert L. Carlson

[57] ABSTRACT

A glass breaking system is provided for breaking large sheets of glass into small sheets, in which a laser beam having an elongated beam spot shape, with a largest dimension which is at least 20 mm, more preferably at least 30 mm, and most preferably at least 40 mm, is moved across a glass sheet to produce a partial crack score line. The glass sheet is then separated along the score line by applying a bending moment in the area of the partial crack.

22 Claims, 3 Drawing Sheets

METHOD AND APPARATUS FOR BREAKING BRITTLE MATERIALS

RELATED APPLICATIONS

This application is a Continuation-In-Part Application of both U.S. Ser. Nos. 08/308,276, filed Sep. 19, 1994, now U.S. Pat. No. 5,622,540, titled METHOD OF BREAKING A GLASS SHEET, and 08/521,616, filed Aug. 31, 1995, titled METHOD AND APPARATUS FOR BREAKING BRITTLE MATERIALS, now abandoned, and also claims the benefit of the priority date of U.S. Provisional Application No. 60/000,497, filed Jun. 26, 1995.

FIELD OF THE INVENTION

The present invention relates to a method for breaking glass sheets and other brittle materials, more particularly a method for increasing the speed of laser scoring processes so that they can effectively be used in processes for making glass substrates for flat panel display applications.

BACKGROUND OF THE INVENTION

Lasers have been used heretofore for splitting glass plates. PCT Patent Publication Number WO 93/20015 to Kondratenko describes utilizing a laser to propagate a so-called blind crack across a glass sheet to break the sheet into two smaller glass sheets. This partial crack, which extends partway through the depth of the glass sheet, essentially operates as a scoreline. The sheet is then separated into the two smaller sheets by mechanical breaking along the line of the scoreline.

In one embodiment, a small nick or scribe is made at one side of the glass sheet, and this nick or scribe is then propagated in the form of a partial crack through the glass sheet using a laser. The laser is then contacted with the glass sheet in the area of the nick or scribe and the laser and glass sheet are moved relative to one another, so that the laser travels in the desired path of the scoreline. A stream of fluid coolant is preferably directed at a point on the heated surface of the glass just downstream from the laser, so that after the laser has heated a region of the glass sheet, the heated region is quickly cooled. In this way, the heating of the glass sheet by the laser and the cooling of the glass sheet by the water coolant creates stresses in the glass sheet which cause the crack to propagate in the direction that the laser and coolant have traveled.

Kondratenko teaches that the shape of the beam where it impinges on the glass sheet should be elliptical, and that the minor and major axes of the elliptical shape should satisfy the following relationship:

a=0.2 to 2.0 h, and b=1.0 to 10.0 h, where a and b are, respectively, the lengths of the minor and major axes of the elliptical beam spot; and h is the thickness of the material to be laser scored. According to Kondratenko, when b is greater than 10.0 h, the cutting accuracy is impaired. Thus, for a glass substrate having a thickness of 0.7 mm (a common thickness for liquid crystal display substrates), Kondratenko teaches that the major axis of the beam spot can be no more than 7 mm in length.

The development of such laser scoring techniques has resulted in some good results in terms of quality break edges, making them potentially useful in the manufacture of liquid crystal and other flat panel display panel substrates, where the quality of edge breaks is desirably very high. However, although considerable effort has been exerted over the past few years on developing such processes, to date none have been able to achieve high enough scoring speeds to make them very practical for use in the production of flat panel display (such as LCD) substrates. Indeed, in the highest scoring speed reported in the examples of the Kondratenko patent is 120 mm/second, with the vast majority of the other examples being much less than this relatively mediocre scoring speed.

A recent publication distributed by Jenoptik at the 1995 Trade Fair in Munich, Germany on Jul. 19–23, 1995, indicates a capability to laser score at speeds of 30–150 mm/sec. Jenoptik notably utilizes the same laser scoring process described in the Kondratenko patent.

It would be desirable to design a laser scoring process which is capable of higher scoring speeds which would make these processes practical for the production of flat panel display substrates, e.g., on the order of at least 300 mm/second, more preferably at least 500 mm/second, and most preferably at least 1000 mm/sec.

SUMMARY OF THE INVENTION

The present invention relates to a method for breaking sheets of glass (and also sheets of other brittle materials), wherein an extremely elongated laser beam (and an optional coolant) is moved in a desired path across the glass sheet in order to lead a crack along the path of the laser beam. The temperature gradient thus produced induces tensile stresses in the surface layers of the glass and as these stresses exceed the tensile strength of the glass, the glass develops a blind crack or scoreline penetrating the material down to the regions which are under compression. As the laser beam is then moved across the glass, the crack follows the laser. The depth, shape and direction of the crack are determined by the distribution of the stresses, which are in turn dependent on several factors, such as the power density, dimensions and shape of the beam spot; the rate of relative displacement of the beam spot and the material; the nature and quantity of the coolant supplied to the heated zone; and the thermophysical and mechanical properties of the material being cracked, as well as its thickness. We have found that by utilizing a laser beam having an extremely elongated beam spot where it impinges on the glass, and aligning this elongated beam spot in the direction of travel of the desired line of separation on the glass sheet, much higher laser scoring speeds are achievable than were previous using the methods of the prior art.

Thus, in the present invention, the laser spot has an extremely elongated shape, e.g. an elliptical shape. Preferably this elongated shape has a major axis greater than 20, more preferably greater than 30, and most preferably greater than 40 mm long.

It is currently believed that the minor axis of the beam should be as narrow as possible without detrimentally affecting the quality of the edge break, to facilitate the formation of straight edge breaks.

In the present invention, the laser preferably has an intensity profile which is non-Gaussian. In one embodiment the intensity of the laser beam is bimodal, that is, it incorporates levels of more than one mode, for example, such as a laser which is operated to incorporates both the $TEM_{01*}$ and $TEM_{00}$ modes. A stream or a jet of a suitable coolant is preferably directed at an area of the material in the wake of the advancing beam spot, to bring about sharp localized cooling of the surface layer along the line of the cut.

The present invention is advantageous over the prior art, in that scoring speeds of 300–700 mm/second and higher are achievable on glass thicknesses between about 0.4 and 3.0 mm thick, without jeopardizing the cutting accuracy or the resultant edge of the cut glass.

DETAILED DESCRIPTION OF THE INVENTION

Figure 1:
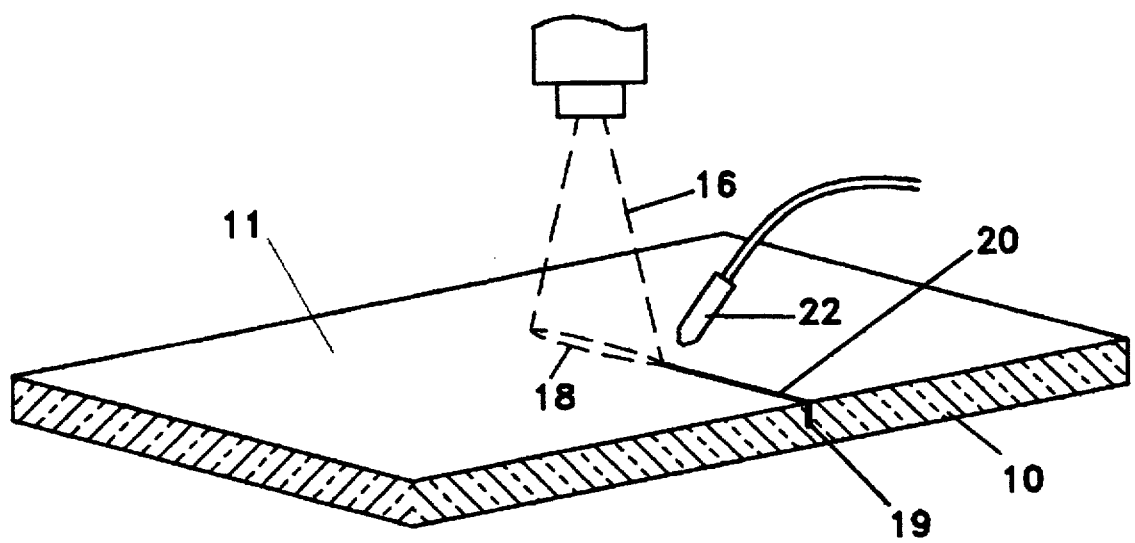
FIG. 1 illustrates a process for cutting glass in accordance with the present invention.

The present invention relates to a system for breaking glass sheets along a desired line of separation using a laser separation technique. As illustrated in FIG. 1, in the glass breaking system of the present invention, glass sheet 10 has upper and lower major surfaces 11. Glass sheet 10 is first nicked or scored along one edge of the glass sheet to form a crack initiation point 19 at one edge of the glass sheet 10. This crack initiation point 19 is then used to form crack 20, by movement of laser beam 16 across glass sheet 10 in the path of the desired line of separation. The laser effectively heats the glass sheet in a localized area along the desired line of separation. The resultant temperature gradient produced induces tensile stresses in the surface layers of the material and as these stresses exceed the tensile strength of the material, the material develops a blind crack penetrating the material down to the regions which are under compression. Preferably, water coolant is applied through water jet 22 to enhance the stress distribution and thereby enhance crack propagation. As the laser beam is moved across the glass, the crack follows the path traveled by the laser beam.

Because the temperature of the surface of the glass 10 is directly dependent on the time of its exposure to laser beam 16, the use of a beam of elliptical instead of circular cross-section extends the time of the heating of each point on the surface of the glass 10 along the cutting line for the same rate of relative displacement. Hence, with a set power density for laser beam 16, and with the same distance from the laser beam spot to the front edge of the coolant spot, which is essential for maintaining the required depth of heating of the glass 10, the greater the laser beam spot is extended in the displacement direction, and the greater will be the allowable rate of the relative displacement of the laser beam spot and material.

Figure 2:
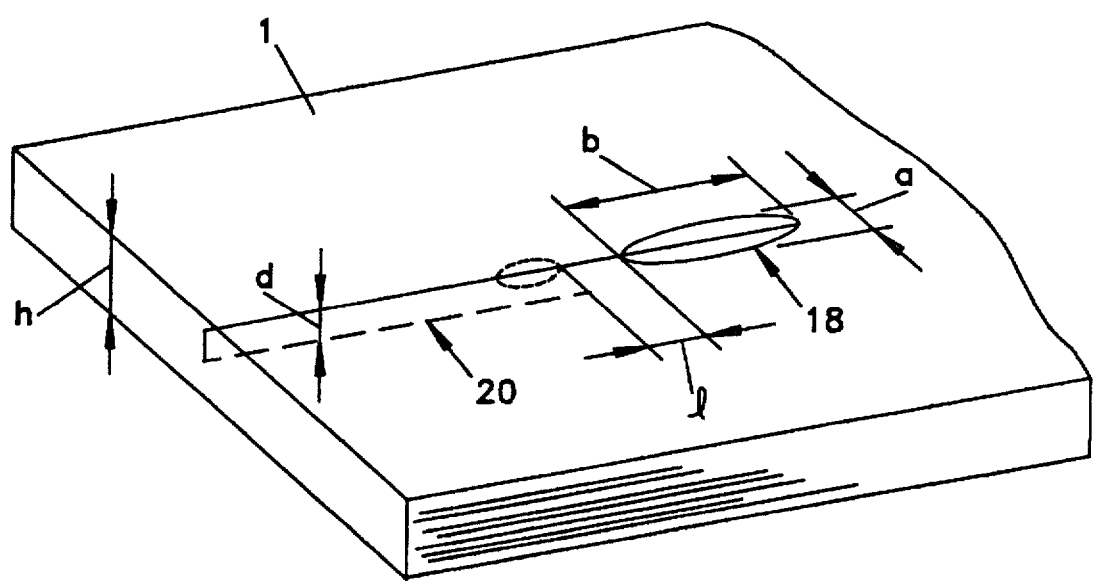
FIG. 2 is an enlarged view of the laser beam spot impinging on the glass surface in the process illustrated by FIG. 1.

As illustrated in FIG. 2, in the present invention, the laser spot has an extremely elongated, e.g. elliptical shape, having a major axis b greater than 20, more preferably greater than 30, and most preferably 40–100 mm or greater. The elongated axis of the laser beam spot is aligned with the direction of travel of the desired line of separation across the glass sheet. For thin sheets of glass (1.1 mm or thinner), we have found that the optimum length of the major axis of the laser beam spot is related to the desired speed of travel in that major axis b should preferably be greater than 10 percent of the desired laser scoring speed per second. Thus, for a desired laser scoring speed of 500 mm on 0.7 mm thick glass, the major axis of the laser should preferably be at least 50 mm long.

Crack 20 preferably extends only partially (a distance d) into the depth of glass sheet 10 so that it acts as a scoreline.

Final separation of the glass sheet into smaller sheets is then achieved by applying a bending moment under crack 20. Such bending can be accomplished using conventional bending apparatus (not shown) and techniques such as are used to break glass sheets in processes employing the more conventional mechanical surface scoring methods. Because crack 20 is formed using the laser breaking technique rather than mechanical scoring, the formation of glass chips during the mechanical breaking step is greatly minimized compared to past techniques.

The laser beam used for the glass breaking operation should be able to heat the surface of the glass to be cut. Consequently, the laser radiation preferably is at a wavelength which can be absorbed by the glass. For this to occur, the radiation should preferably be in the infra-red range, with a wavelength in excess of 2 µm, such as the beam of a $CO_2$ laser, with its wavelength of 9–11 µm; or a CO laser with its wavelength of 5–6 µm, or an HF laser with its wavelength of 2.6–3.0 µm, or an erbium YAG laser, with its wavelength of about 2.9 µm. While the majority of current experiments have employed the use of $CO_2$ lasers having powers in the 150–300 watt range, it is believed that even higher power lasers could be successfully used.

Crack 20 is formed in the glass down to the interface of the heated and cooled zones, that is in the area of the maximum thermal gradient. The depth, shape and direction of the crack are determined by the distribution of the thermoelastic stresses, which in turn are dependent primarily on the following several factors:

the power density, dimensions and shape of the beam spot;

the rate of relative displacement of the beam spot and the material;

the thermophysical properties, quality and conditions of supply of the coolant to the heated zone; and the thermophysical and mechanical properties of the material to be cracked, its thickness, and the state of its surface.

To optimize the cutting cycle for different materials, it is necessary to establish the proper relationship between the major parameters and variables of the cutting process. As explained in PCT International Publication Number WO 93/20015, the specification of which is hereby incorporated by reference, and referring again to FIG. 2, depending on the dimension of the beam spot 18 and its spacing I from the area on which the coolant stream falls, the speed V of the relative displacement of beam spot 18 across the glass 10, and the depth d of crack 20, are related by the expression:

$V = k \, a(b+l)/d$, where:

V is the rate of relative displacement of the beam spot 18 and of the material 10;

k is a proportionality factor dependant on the thermophysical properties of the material and the beam power density;

a is the width of the beam spot;

b is the length of the beam spot;

I is the distance from the rear edge of the beam spot to the front edge of the cooled zone, and d is the depth of the blind crack 4.

Lasers operate by laser oscillation which takes place in a resonant cavity defined by the mirrors at each end. The concept of a stable resonator can best be visualized by following the path of a light ray through the cavity. The threshold of stability is reached if a light ray initially parallel to the axis of the laser cavity could be reflected forever back and forth between the two mirrors without escaping from between them.

Resonators which do not meet the stability criteria are called unstable resonators, because the light rays diverge away from the axis. There are many variations on the unstable resonator. One simple example is a convex spherical mirror opposite a flat mirror. Others include concave mirrors of different diameters (so that the light reflected from the larger mirror escapes around the edges of the smaller one), and pairs of convex mirrors.

The two types of resonators have different advantages and different mode patterns. The stable resonator concentrates light along the laser axis, extracting energy efficiently from that region, but not from the outer regions far from the axis. The beam it produces has an intensity peak in the center, and a Gaussian drop in intensity with increasing distance from the axis. This is the standard type used with low-gain and continuous-wave lasers.

The unstable resonator tends to spread the light inside the laser cavity over a larger volume. For example, the output beam may have an annular profile, with peak intensity in a ring around the axis.

Laser resonators have two distinct types of modes: transverse and longitudinal. Transverse modes manifest themselves in the cross-sectional profile of the beam, that is, in its intensity pattern. Longitudinal modes correspond to different resonances along the length of the laser cavity which occur at different frequencies or wavelengths within the gain bandwidth of the laser. A single transverse mode laser that oscillates in a single longitudinal mode is oscillating at only a single frequency; one oscillating in two longitudinal modes is simultaneously oscillating at two separate (but usually closely spaced) wavelengths.

Figure 3:
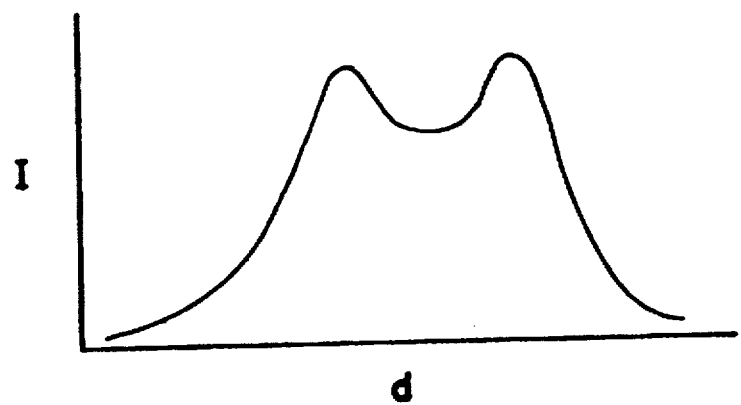
FIG. 3 illustrates a desirable power intensity profile for the laser beam employed in FIGS. 1 and 2.
Figure 4:
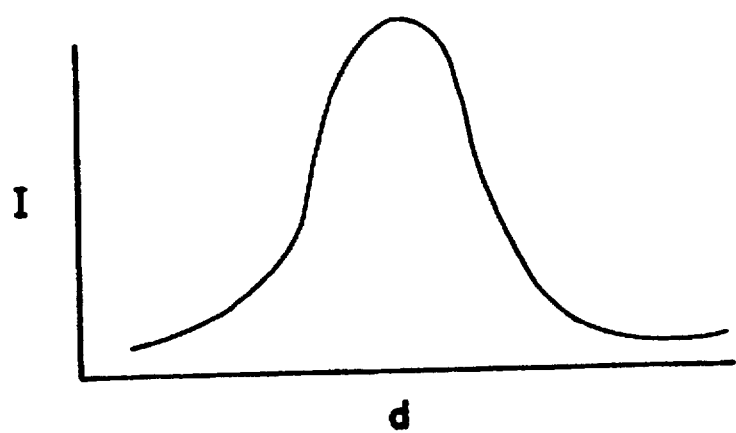
FIG. 4 illustrates the power intensity profile for a standard Gaussian laser beam.

The "shape" of the electromagnetic field within the laser resonator is dependent upon the mirror curvature, spacing, bore diameter of the discharge tube, and the wavelength. Small changes in mirror alignment, spacing or wavelength can cause dramatic changes in the "shape" of the laser beam (which is an electromagnetic field). A special terminology has evolved for describing the "shape", or energy distribution in space, of the beam, in which transverse modes are classified according to the number of nulls that appear across the beam cross section in two directions. The lowest-order, or fundamental mode, where intensity peaks at the center, is known as the $TEM_{00}$ mode. This is the more conventionally used laser which has a Gaussian power distribution, as illustrated in FIG. 4. A mode with single null along one axis and no null in the perpendicular direction is $TEM_{01}$, or $TEM_{10}$, depending on orientation. An example of a $TEM_{01*}$ mode power distribution is illustrated in FIG. 3 (Beam intensity I vs. distance d across the beam). For most laser applications, the $TEM_{00}$ mode is considered most desirable. However, we have found that non-Gaussian modes, such as, for example, the $TEM_{01}$ and $TEM_{10}$ mode beams, can be used to deliver the laser energy more uniformly to the glass surface. As a result, we have found that higher laser scoring speeds can be achieved using lower powers than if the laser had a Gaussian power distribution. In addition, the operable window in which the laser scoring process is enlarged, enabling the use of a wider range of laser powers. It believed that this is because non-Gaussian laser beams can provide improved uniformity of energy distribution across the beam.

The laser beam illustrated in FIG. 3 consists of an annular ring. Thus, the power distribution illustrated in FIG. 3 is a cross-section of the power distribution of an annular ring-like laser beam. Such non-Gaussian beams, which have at least a pair of intensity peaks located outside a center region of lower power distribution, are preferred in the present invention. The center of the laser beam thus preferably has a lower power intensity than at least some of the outer regions of the laser beam. This lower power center region may go completely to a zero power level, in which case the laser beam would be a 100 percent $TEM_{01*}$ power distribution. Preferably, however, the laser beam is bimodal, that is, it incorporates levels of more than one mode, such as a combination of $TEM_{01*}$, and $TEM_{00}$ modes, as illustrated in FIG. 3, wherein the power distribution of the center region merely dips below that of the outer region. In cases in which the beam is bimodal, the beam preferably incorporates greater than 50 percent $TEM_{01*}$, and more preferably greater than 70 percent $TEM_{01*}$, the remainder being the $TEM_{00}$ mode.

In the preferred embodiment of the invention, a system controller, such as a digital computer (not shown) is operatively connected to the system to control movement of the laser and/or the glass sheet, as well as other moving parts on the system. The system controller utilizes conventional machine control techniques to control movement of the various components of the system. Preferably, the system controller utilizes various production operating programs stored in its memory, each program designed to appropriately control movement of the laser or glass sheet (and other moving parts, if necessary) for a particular size glass sheet.

The following examples, which are intended to be illustrative rather than limiting, demonstrate methods in accordance with the present invention.

EXAMPLE 1

This example illustrates the performance of a $CO_2$ laser having a Gaussian power distribution.

Laser 16 was an axial flow dual beam $CO_2$ laser, Model 1200, manufactured by PRC Corporation of North Frontage Road, Landing, New Jersey 07850. The beam was operated in the $TEM_{00}$ mode, and had a spot size (the diameter of the laser beam where it exits the laser) of about 12 mm and was located about 2 meters from the glass surface. A pair of cylindrical lenses were located in the path of the laser, between the laser and the glass surface, to shape the laser spot. This resulted in a laser spot shape, where the laser impinged on the glass, which was elongated and somewhat elliptical, about 45–50 mm long and about 0.1 to 0.15 cm wide at its midpoint. The fundamental mode of the resonator of this laser is $TEM_{00}$. When this is the only mode allowed to oscillate in the resonator, the resultant 00 mode laser will propagate with the lowest possible divergence and focus to the smallest spot size. In this example, the power distribution of the laser was allowed to be Gaussian (and thus operated in the $TEM_{00}$ mode) by employing a "flat" optical coupler at the front of the laser in conjunction with a small internal aperture.

Aluminosilicate glass sheets 10 approximately 500 mm wide by 500 mm long by about 1.1 mm thick were manually scribed on the edge of the glass sheet to form a crack initiation point 19. This created a crack initiation point 19 in the form of a small score line, approximately 8 mm long and approximately 0.1 mm deep, at one edge on the top surface of the glass. Glass sheet 10 was positioned so that laser 16 contacted the crack initiation point 19, and the glass sheet 10 was moved so that the path of laser 16 followed a straight path across the glass sheet, at the powers and speeds listed in Table I below.

TABLE I

| Laser Speed | Peak Power (Watts) | percent success |
| --- | --- | --- |
| 400 mm/sec. | 120 | 100 |
| 420 mm/sec. | 120–165 | 100 |
| 465 mm/sec. | 165–175 | 100 |
| 475 mm/sec. | 165–179 | 100 |
| 480 mm/sec. | 168–179 | 66 |
| 500 mm/sec. | 183–188 | 33 |

The percent success column indicates the best performance that was achieved for the corresponding power ranges. A 100 percent success rating indicates that there were operating parameters in the power range specified where the process successfully laser scored glass sheets essentially 100 percent of the time.

EXAMPLE 2

The same method, apparatus and laser described in Example 1 was utilized, except that the resonator was altered to cause the laser to operate in higher order mode power distributions. In particular, the laser was a bimodal beam, meaning it was composed of several sub-beams, each with its own intensity profile. Because these beams are independent, the net profile is an algebraic sum of the individual profiles, weighted by the percent of power in each mode. For example, the amount of $TEM_{00}$ mode can be reduced by changing the curvature of the optical coupler, or increasing the diameter of the aperture. In the present example, the power distribution of the laser was changed to an approximately 60/40 blend of $TEM_{01*}$ and $TEM_{00}$ mode (resulting in a spot size of about 14 mm), and about a 50–60 mm beam length. This was accomplished by replacing the "flat" optical coupler with a 20 meter radius concave optical coupler, and installing a larger aperture. The power and speed of the laser was altered as listed in Table II.

TABLE II

| Laser Speed | Power | Percent Success |
| --- | --- | --- |
| 300 mm/sec. | 90–145 W | 100 |
| 500 mm/sec. | 155–195 W | 100 |
| 600 mm/sec. | 200 W | 100 |
| 650 mm/sec. | 200–220 W | 100 |
| 700 mm/sec. | 250 | 50 |

When the laser used in Example 1 was converted to a non-Gaussian laser which had a degree of $TEM_{01*}$ mode, higher cutting speeds were achieved using lower laser power. In addition, a wider range of laser powers seemed to be acceptable to achieve a satisfactory scored edge. As can be seen by comparing the results of Examples 1 and 2, the Gaussian laser was capable of achieving 100 percent breakage (essentially all of the samples were successfully scored) at cutting speeds of up to 475 mm/sec. Above these speeds, it was more difficult to achieve consistent satisfactory results. However, it is presently expected that 1000 and even 2000 mm/second will be achieved using the longer beam length methods of the present invention.

EXAMPLE 3

In this example, the laser which produced the laser beam was an axial flow $CO_2$ laser, Model SS/200/2 dual beam laser with 600 watts per tube, manufactured by PRC Corporation of North Frontage Road, Landing, New Jersey 07850. The beam had a spot size (the diameter of the laser beam where it exits the laser) of about 12 mm for the $TEM_{00}$ mode. This laser was located about 2 meters from the glass surface. A pair of cylindrical lenses were located in the path of the laser beam, between the laser and the glass surface, to shape the laser spot. This resulted in a laser spot shape, where the laser impinged on the glass, which was elongated and somewhat elliptical, about 40–50 mm long and about 1 to 1.5 mm wide at its midpoint. The power distribution of the laser was a 60/40 blend of $TEM_{01*}$ and $TEM_{00}$ mode, which was achieved by employing a 20 meter radius concave optical coupler at the front of the laser. The power of the laser was varied between 160–200 watts and the speed of the laser as it moved across the glass sheet was about 500 mm/sec.

Glass sheet 10, which was an aluminosilicate glass sheet approximately 500 mm wide by 500 mm long by about 1.1 mm thick, was laser scored 9 times, three times on one side of the sheet in a first direction, and three times on the other side of the sheet in a second direction, the second direction being orthogonal to the direction of the first score lines. This type of scoring arrangement is designed to duplicate production operations for making LCD substrate glass, wherein the outermost score lines are meant to remove the outer edge portion of the glass sheets, and the middle score lines on each side of the sheet are meant to cooperatively separate the remainder of the glass into four usable pieces. The use of three score lines on each side of the glass sheet resulted in 9 intersection points wherein the path of the score line on one side of the sheet intersected the path of the score line on the other side of the sheet.

To accomplish this, the glass sheet 10 was manually scribed on each side along the edge of the glass sheet to form three crack initiation points 19 at locations where a laser score line was desired. This created three crack initiation points 19 in the form of small score lines approximately 1–8 mm long and approximately 0.1 mm deep, at one edge on the top surface of the glass. It is not necessary that the crack be 4–8 mm, but rather any crack which the laser can propagate is sufficient to serve as a crack initiation point. Glass sheet 10 was positioned so that laser 16 contacted one of the crack initiation points 19, and the glass sheet 10 was moved so that the path of laser 16 followed a straight path across the glass sheet, forming score line 20, as illustrated in FIG. 1. This process was repeated for each of the three score lines 20 on the first side of the glass sheet.

Glass sheet 10 was then turned over to expose the opposite side of glass sheet 10. The sheet 10 was manually scribed along the edge of the glass sheet to form three other crack initiation points 19, and the glass sheet 10 was again moved so that the path of laser 16 followed a straight path across the glass sheet, to form three score lines 20. The three score lines 20 made on the second side of the sheet were orthogonal to and on the opposite side of the three score lines 20 formed on the first side of glass sheet 10, and intersected the path of each of these score lines 20 at a right angle.

A bending moment was then applied under score line 20 to separate glass sheet 10 along each of the score lines. These resultant sheets were then turned over and a bending moment was applied to these sheets in the area of their respective score lines 20, thereby breaking them into even smaller sheets. This process was repeated on more than 100 glass sheets, thereby forming over 900 points wherein the path of a score line 20 intersected the path of a score line 20 located on the opposite side of the glass sheet. In all cases, the break edges were consistently of a very high quality.

EXAMPLE 4

In this example, a single $CO_2$ laser 16 was used to both selectively remove a portion of a protective plastic layer and separate glass sheet 10 into smaller sheets. Glass sheets approximately 400 mm wide by 400 mm long by 1.1 mm thick were coated with a protective layer of LFC-3 masking film, manufactured by Main Tape Corporation. LFC-3 is a polyethylene film material, approximately 0.002 inches thick, stored in roll form and has an acrylic adhesive on one side. The film was applied to glass so that the adhesive contacted the glass sheet, and the coated glass was then squeezed between a pair of rollers to promote adhesion of the film to the glass sheet.

In this example, laser 16 was an axial flow dual beam $CO_2$ laser, Model 1200, manufactured by PRC Corporation of North Frontage Road, Landing, New Jersey 07850. The laser beam had about a 7 mm diameter where it exits the laser, resulting in a spot size (area) where it exits the laser of about 38.5 $mm^2$, and was operated at approximately 70 W, resulting in a beam power density of about 1.82 $W/mm^2$. The laser was located about 2 meters from the protective layer on the glass surface. A pair of cylindrical lenses were located in the path of the laser, between the laser and the glass surface, to shape the laser spot. This resulted in a laser spot shape, where the laser impinged on the protective layer, which was elongated and somewhat elliptical, about 33 mm long and 2 mm wide at its midpoint, and having a power density of about 1.35 $W/mm^2$.

The glass was moved under laser 16 at a speed of about 250 mm/min. Laser 16 successfully vaporized all of the protective layer (and the adhesive) it contacted, resulting in the selective removal of protective layer, and the production of a removed strip 14 approximately 2 mm wide. The area where the protective layer was removed showed no remaining residue, and the ability to peal away the remainder of protective layer was not compromised.

Glass sheet 10 was manually scribed on the edge of the glass sheet to form a crack initiation point 19. The glass was scored in the area 14 where the protective layer had been selectively removed. This created a crack initiation point 19 in the form of a small score line, approximately 8 mm long and approximately 0.1 mm deep, at one edge on the top surface of the glass. Glass sheet 10 was positioned so that laser 16 contacted the crack initiation point 19, and the glass sheet 10 was moved so that the path of laser 16 followed the same path of the first sweep of laser 16. Consequently, laser 16 traveled within the selectively removed portion 14 of protective layer. Glass sheet 10 was moved at a speed of about 250 mm/min. The laser effectively heated the glass in areas where the laser impinged on the glass surface. As a result of the localized heating caused by the laser, a crack propagated across the glass surface, starting from crack initiation point 19 and continuing along the path followed by the laser 16. This crack was approximately 0.1 mm deep. Pressure was then manually applied to the glass sheet to apply a bending moment to the laser generated crack, causing the glass sheet 10 to separate into two sheets.

Although the invention has been described in detail for the purpose of illustration, it is understood that such detail is solely for that purpose and variations can be made therein by those skilled in the art, without departing from the spirit and scope of the invention, which is defined by the following claims.

What is claimed is:

1. A method for separating flat glass sheets comprising:
moving a laser beam across a glass sheet having a thickness of 2 mm or less to draw a crack across said sheet, said laser beam moving in a direction of travel and having an elongated beam spot where it impinges on said glass sheet, said beam spot having a width and length dimension, the length of the spot being longer than the width of the spot, the length dimension being greater that 20 mm, said length dimension aligned with said direction of travel; and separating said sheet along said crack.

2. The method of claim 1, wherein said moving step comprises moving a laser beam having a beam spot whose length dimension is greater than about 30 mm.

3. The method of claim 2, wherein laser beam in said moving step comprises a non-Gaussian component.

4. The method of claim 3, wherein said laser beam in said moving step comprises a combination of $TEM_{01^*}$ and $TEM_{00}$ modes.

5. The method of claim 4, wherein said laser beam in said moving step comprises at least 50 percent $TEM_{01^*}$ mode component, the remainder being $TEM_{00}$ mode.

6. The method of claim 1, wherein said moving step comprises moving a laser beam having a beam spot whose length dimension is greater than about 40 mm.

7. The method of claim 1, wherein said moving step comprises moving said laser beam, with respect to said glass sheet, at a speed of at least 300 mm/second.

8. The method of claim 1, wherein said moving step comprises moving said laser beam, with respect to said glass sheet, at a speed of at least 400 mm/second.

9. The method of claim 1, wherein said moving step comprises moving said laser beam, with respect to said glass sheet, at a speed of at least 500 mm/second.

10. The method of claim 1, wherein said moving step comprises moving said laser beam at a speed of at least 300 mm/sec, and the magnitude of said length dimension, expressed in terms of mm length, is greater than about 10 percent of the magnitude of said speed, expressed in terms of mm/sec.

11. The method of claim 1, wherein the laser beam in said moving step comprises a non-Gaussian component.

12. A method for separating glass substrates for use in flat panel display applications having a thickness between 0.4 and 3.0 mm, comprising: providing a flat glass sheet having a thickness between about 0.4 and 3.0 mm; using a laser having at least 90 watts of power, forming a laser beam; and moving said laser beam across said glass sheet at a speed of at least 300 mm/second, said laser beam having an elongated beam spot where it impinges on said glass sheet, said beam spot having length and width dimension, said length dimension being greater than 30 mm, wherein said moving is sufficient to draw a crack across said glass sheet, and separating said sheet along said crack.

13. The method of claim 12, wherein said moving step comprises moving a laser beam having a beam spot whose longest dimension is greater than about 30 mm.

14. The method of claim 13, wherein laser beam in said moving step comprises a non-Gaussian component.

15. The method of claim 13, wherein said laser beam in said moving step comprises a combination of $TEM_{01}$ and $TEM_{00}$ modes.

16. The method of claim 12, wherein said moving step comprises moving a laser beam having a beam spot whose longest dimension is greater than about 40 mm.

17. The method of claim 12, wherein said moving step comprises moving said laser beam, with respect to said glass sheet, at a speed of at least 400 mm/second.

18. The method of claim 12, wherein said moving step comprises moving said laser beam, with respect to said glass sheet, at a speed of at least 500 mm/second.

19. The method of claim 12, wherein said laser beam in said moving step comprises a beam spot whose length axis is greater in length than about 10 percent of said speed.

20. The method of claim 12, wherein the laser beam in said moving step comprises a non-Gaussian component.

21. A method for breaking flat glass sheets comprising:

moving a laser beam across a glass sheet to thereby lead a partial depth crack across said sheet in a desired line of separation, said laser beam being dominantly in a ring mode, with a central region thereof being hollow, said beam having an elongated beam spot where it impinges on said glass sheet, said beam spot having a length and width dimension, the length dimension being greater than 20 mm, and aligned with said line of separation;

and separating said sheet along said crack.

22. The method of claim 11, wherein said laser beam comprises a power distribution across said length dimension, which comprises at least two peak power intensities, and at least one lower power region between said two peak power intensities.

* * * * *